United States Patent
Shepherd et al.

(10) Patent No.: US 11,340,913 B2
(45) Date of Patent: May 24, 2022

(54) SYSTEMS AND METHODS FOR IMPLEMENTING MODEL-BASED APPLICATION CONTROL FRAMEWORKS

(71) Applicant: JPMorgan Chase Bank, N.A., New York, NY (US)

(72) Inventors: Martin Shepherd, Christchurch (GB); Mark Andrew Johnson, London (GB); Ian Royle, Fordingbridge (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 223 days.

(21) Appl. No.: 16/367,609

(22) Filed: Mar. 28, 2019

(65) Prior Publication Data
US 2020/0310829 A1    Oct. 1, 2020

(51) Int. Cl.
G06F 9/445    (2018.01)
G06F 8/35    (2018.01)
G06F 8/36    (2018.01)
G06F 8/71    (2018.01)

(52) U.S. Cl.
CPC ............ *G06F 9/44505* (2013.01); *G06F 8/35* (2013.01); *G06F 8/36* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 8,037,453 B1 * | 10/2011 | Zawadzki | G06F 8/71 717/123 |
| 8,595,331 B2 * | 11/2013 | Henseler | G06F 9/5027 709/220 |
| 8,914,794 B2 * | 12/2014 | Bliss | G06F 8/30 717/174 |
| 9,928,059 B1 * | 3/2018 | Sartor | G06F 8/71 |
| 2007/0169049 A1 * | 7/2007 | Gingell | G06F 8/61 717/151 |
| 2007/0209034 A1 * | 9/2007 | Doganata | G06F 9/548 717/174 |

(Continued)

OTHER PUBLICATIONS

International Search Report, dated Jun. 15, 2020, from corresponding International Application No. PCT/US2020/024392.

(Continued)

*Primary Examiner* — Ryan D. Coyer
(74) *Attorney, Agent, or Firm* — Greenberg Traurig LLP (57) ABSTRACT

Systems and methods for implementing model-based application control frameworks are disclosed. In one embodiment, in an information processing apparatus comprising at least one computer processor, a method for implementing model-based application control frameworks may include: (1) breaking an application into a plurality of modules, wherein each module comprises a component of the application that is capable of running independently; (2) determining a plurality of attributes for each of the modules; (3) identifying a deployment platform for each module; (4) building an attribute model for the application based on the modules, the attributes, and the deployment platform; (5) identifying control requirements for the attribute model; (6) identifying actions to implement the control requirements; and (7) deploying the actions to implement the control requirements to the application.

20 Claims, 3 Drawing Sheets

(56) References Cited

U.S. PATENT DOCUMENTS

| | | | | |
|---|---|---|---|---|
| 2009/0049438 A1* | 2/2009 | Draper | ............... | G06F 8/10 |
| | | | | 717/168 |
| 2011/0145789 A1* | 6/2011 | Rasch | ............... | G06F 9/44505 |
| | | | | 717/121 |
| 2012/0117560 A1* | 5/2012 | Vorthmann | ............... | G06F 8/60 |
| | | | | 717/177 |
| 2014/0250427 A1* | 9/2014 | Wong | ............... | G06F 11/3664 |
| | | | | 717/126 |
| 2017/0078216 A1* | 3/2017 | Adolph | ............... | G06F 9/45558 |
| 2018/0357045 A1* | 12/2018 | Hollands | ............... | G06F 8/10 |

OTHER PUBLICATIONS

Written Opinion of the International Searching Authority, dated Jun. 15, 2020, from corresponding International Application No. PCT/US2020/024392.

\* cited by examiner

SYSTEMS AND METHODS FOR IMPLEMENTING MODEL-BASED APPLICATION CONTROL FRAMEWORKS

BACKGROUND OF THE INVENTION

1. Field of the Invention

The present invention generally relates to systems and methods for implementing model-based application control frameworks.

2. Description of the Related Art

The technology domain landscape is vast—yet it can be so specific depending, for example, on a geographic location and/or deployment type (e.g., on-premises versus in the cloud, etc.) that it is impossible for technologists to understand what controls (e.g., technology governance risk and compliance, technology strategy and portfolio management, technology asset management, identify and access management, data protection, security configuration, vulnerability management, security operations, technology development, technology operations, incident and event management, technology resiliency, etc.) apply to them, and to ensure that their applications adhere to the those controls.

SUMMARY OF THE INVENTION

Systems and methods for implementing model-based application control frameworks are disclosed. In one embodiment, in an information processing apparatus comprising at least one computer processor, a method for implementing model-based application control frameworks may include: (1) breaking an application into a plurality of modules, wherein each module comprises a component of the application that is capable of running independently; (2) determining a plurality of attributes for each of the modules; (3) identifying a deployment platform for each module; (4) building an attribute model for the application based on the modules, the attributes, and the deployment platform; (5) identifying control requirements for the attribute model; (6) identifying actions to implement the control requirements; and (7) deploying the actions to implement the control requirements to the application.

In one embodiment, the attributes may include at least one of an OS type, a data classification, and external interface.

In one embodiment, the method may further include applying a plurality of questions in a question chain to refine the attributes.

In one embodiment, the attributes may be automatically identified using at least one of a code scan, an inventory system, and a server scan.

In one embodiment, the control requirements may be based on a policy for an organization.

In one embodiment, the actions to implement the control requirements may be specific to the deployment platform.

In one embodiment, the method may further include tracking the implementation of the control requirements into the application.

According to another embodiment, in an information processing apparatus comprising at least one computer processor, a method for implementing model-based application control frameworks may include: (1) breaking an application into a plurality of modules, wherein each module comprises a component of the application that is capable of running independently; (2) determining a plurality of attributes for each of the modules; (3) identifying a deployment platform for each module; (4) identifying a design pattern associated with one of the modules, the attributes for the module, and the deployment platform for the module; (5) identifying control requirements for the design pattern; (6) identifying actions to implement the control requirements; and (7) deploying the actions to implement the control requirements to the application.

In one embodiment, the attributes may include at least one of an OS type, a data classification, and external interface.

In one embodiment, the attributes may be automatically identified using at least one of a code scan, an inventory system, and a server scan.

In one embodiment, the control requirements may be based on a policy for an organization.

In one embodiment, the actions to implement the control requirements may be specific to the deployment platform.

In one embodiment, the method may further include tracking the implementation of the control requirements into the application.

According to another embodiment, a system for implementing model-based application control frameworks may include an environment for hosting an application, the environment comprising a monitoring agent that monitors the application for an action; a database comprising a plurality of control requirements; and an electronic device comprising at least one computer processor. In response to an action identified by the monitoring agent, the electronic device may break the application into a plurality of modules, wherein each module comprises a component of the application that is capable of running independently; determine a plurality of attributes for each of the modules; identify a deployment platform for each module; build an attribute model for the application based on the modules, the attributes, and the deployment platform; identify control requirements in the database for the attribute model; identify actions to implement the control requirements; and deploy the actions to implement the control requirements to the application.

In one embodiment, the attributes may include at least one of an OS type, a data classification, and external interface.

In one embodiment, the electronic device may apply a plurality of questions in a question chain to refine the attributes.

In one embodiment, the attributes may be automatically identified using at least one of a code scan, an inventory system, and a server scan.

In one embodiment, the control requirements may be based on a policy for an organization.

In one embodiment, the actions to implement the control requirements may be specific to the deployment platform.

In one embodiment, the environment may be a development environment or a production environment.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein are directed to systems and methods for implementing model-based application control frameworks.

Figure 1:
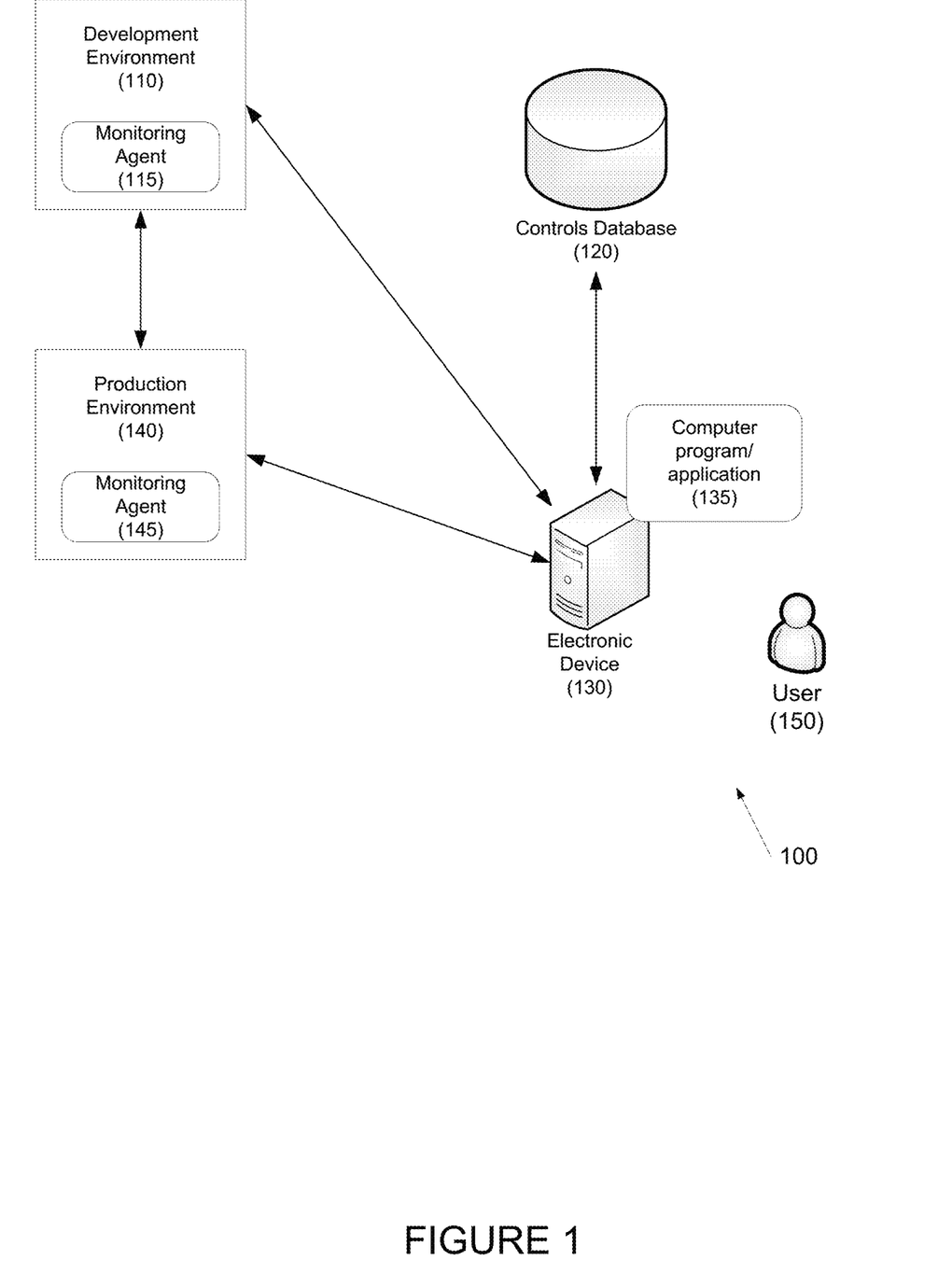
FIG. 1 depicts a system for implementing model-based application control frameworks according to one embodiment.

Referring to FIG. 1, a system for implementing model-based application control frameworks is disclosed according to one embodiment. System 100 may include development platform 110, controls database 120, server 130 executing computer program/application 135, and production environment 140.

In one embodiment, development environment 110 may be an environment in which software applications may be developed. In one embodiment, development environment 110 may include program/application repositories (not shown), code databases (not shown), software development/management systems (not shown), etc.

In one embodiment, development environment 110 may include or may be provided with monitoring agent 115, which may monitor software, programs, applications, etc. in development environment 110, and may initiate the control requirement review process when certain thresholds or triggers (e.g., changes, etc.) are met.

Controls database 120 may store controls that may be applicable to applications being developed in development environment 110. Examples of controls include risk management and security controls, such as technology governance risk and compliance controls, technology strategy and portfolio management controls, technology asset management controls, identify and access management controls, data protection controls, security configuration controls, vulnerability management controls, security operations controls, technology development controls, technology operations controls, incident and event management controls, technology resiliency controls, etc. These controls are exemplary only; the controls may depend on the type of application and/or the environment in which the application will execute.

Electronic device 130 may be any suitable electronic device, including servers, workstations, desktop computers, laptop computers, desktop computers, cloud containers, etc. Electronic device 130 may execute computer program/application 135 that may implement model-based application control frameworks.

In one embodiment, user 150 may access computer program/application 135. In one embodiment, user 150 may define or view control requirements, update attributes and/or modules, adopt design patterns, etc. In one embodiment, user 150 may be a developer, a technologist, an information security manager, or anyone that may need to respond to a request. For example, an information security manager may want a view of what controls are applicable to certain applications, as well as any gaps that exist.

Production environment 140 may be the environment in which an application is deployed after the control(s) are implemented. In one embodiment, production environment may be on-premises (e.g., a server), off-premises (e.g., public cloud, private cloud), in a virtual server, etc.

In one embodiment, production environment 140 may further include sub-environments, such as testing environments.

In one embodiment, production environment 140 may include or may be provided with monitoring agent 145, which may monitor software, programs, applications, etc. in production environment 140, and may initiate the control requirement review process when certain thresholds or triggers (e.g., changes, etc.) are met.

In one embodiment, a single monitoring agent 115 or 145 may be provided for both development environment 110 and production environment 140.

Figure 2:
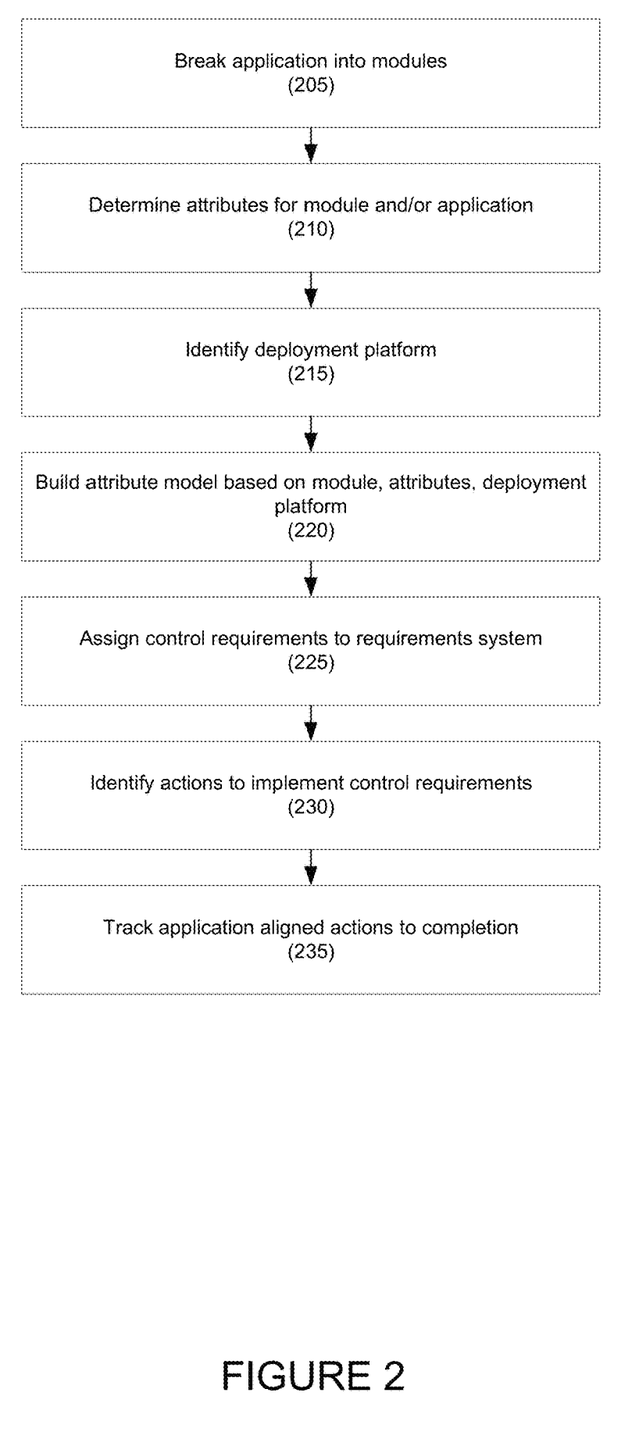
FIG. 2 depicts an method for implementing model-based application control frameworks according to one embodiment.

Referring to FIG. 2, a method for implementing model-based application control frameworks is disclosed according to one embodiment.

In step 205, an application may be broken into its constituent parts, or modules. In one embodiment, the application may be under development, may be complete but not deployed, etc. In one embodiment, constituent parts, or modules, may be capable of running by themselves. Examples of modules include monolithic parts, data stores, microservices, user interfaces, mobile parts, robotic parts, etc. Any other suitable modules or module types may be used as is necessary and/or desired.

In one embodiment, human input may be used to identify the modules. In another embodiment, an automated method for identifying the modules may be used. For example, code analysis, infrastructure scanning, etc. may be used to identify the modules.

In step 210, one or more attribute for each module and/or application may be determined. Example attributes may include, the module's OS type, data classification, external interface, etc. Any suitable attribute may be used as is necessary and/or desired.

In one embodiment, if necessary, question chains may be applied to the attributes in order to refine the attributes. For example, if the attribute indicates PII data, questions chains may be presented to determine the type of PII data, source of PII data, or any other information as is necessary and/or desired.

In one embodiment, the question chains may provide a tree-based approach that may be tagged against the attributes, and may further refine the attributes.

In one embodiment, the question chains may be used with new applications.

In another embodiment, attributes may be automatically identified using, for example, code scans, inventory systems, server scans, etc. In one embodiment, automated systems may be used with existing programs.

In one embodiment, a combination of manual (e.g., question-based) and automated systems may be used as is necessary and/or desired.

In step 215, the deployment platform for each module and/or application may be determined. Example deployment platforms include private clouds, public clouds, physical servers, virtual servers, etc.

In one embodiment, the deployment platform may be identified as an attribute in step 210, above.

In step 220, an attribute model may be built based on the modules, the attribute(s), and the deployment platform(s). For example, the attribute module may identify the attributes, deployment platforms, etc., that may require controls.

In step 225, control requirements for the application may be identified based on the attribute model, and the control requirements may be assigned to a requirements system. For example, backups may be applicable for a database, but the method to carry out the backup for different databases may differ depending on the deployment location, other attributes, etc.

In one embodiment, policies for the organization may be applied to the attribute model to identify the control requirements.

In step 230, actions to implement the control requirements may be identified, and may be provided to the developer, the build system, etc. In one embodiment, the actions may specify the control requirements to implement, or may provide the control requirements to be implemented in the application. In one embodiment, the specific action may be based on the deployment platform.

In step 235, the development of the application may be tracked to verify that the controls have been implemented in the application. For example, testing criteria may be provided to test the application. In another embodiment, the developer may attest to the implementation of the controls in the application. Other methods for verifying control implementation may be used as is necessary and/or desired.

In another embodiment, an automated mechanism that aligns to many control requirements may be provided. For example, if a design pattern is selected or otherwise identified, the individual control requirements associated with the design pattern may be applied.

Figure 3:
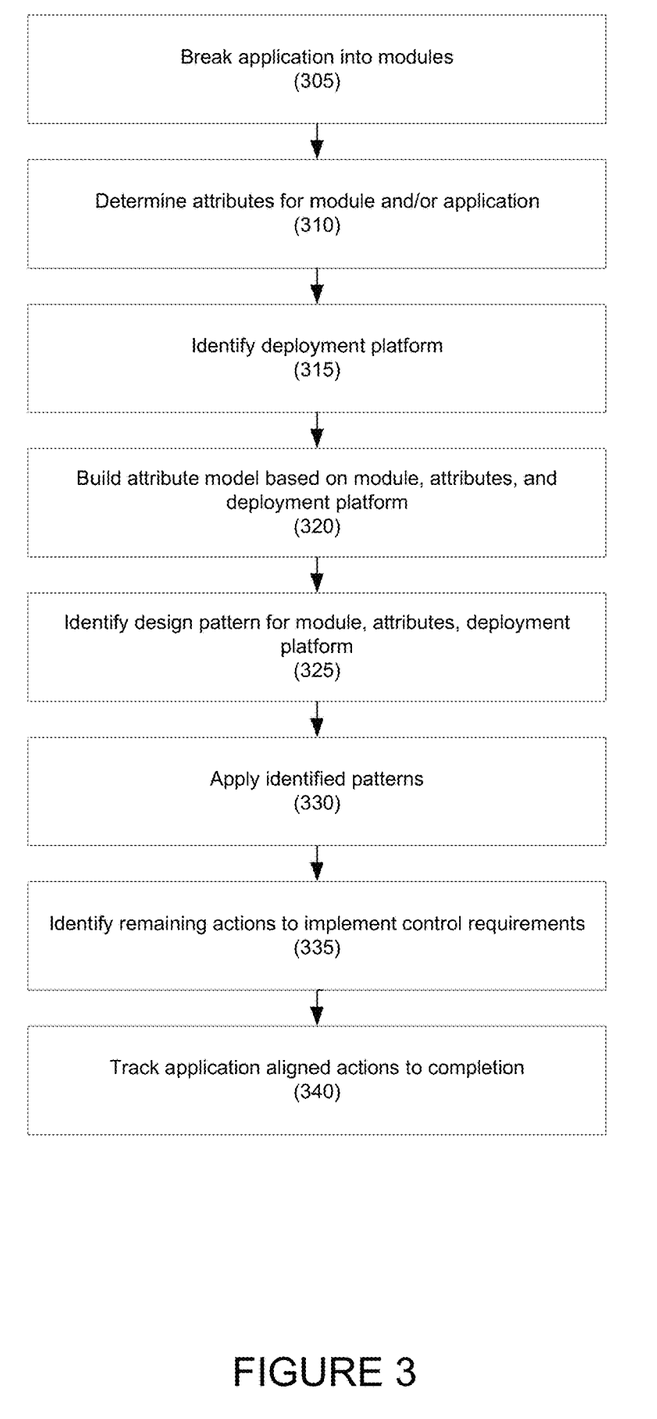
FIG. 3 depicts a method for implementing model-based application control frameworks using associated patterns according to one embodiment.

Referring to FIG. 3, a method for implementing model-based application control frameworks is disclosed according to another embodiment.

In step 305, an application may be broken into its constituent parts, or modules. This may be similar to step 205, above.

In step 310, attributes for the modules may be identified. This may be similar to step 210, above.

In step 315, the deployment platform for each module and/or application may be determined. This may be similar to step 215, above.

In step 320, an attribute mode based on the module, attributes, and deployment platform may be generated, and, in step 325, a design pattern based on the module, attributes, and deployment platform may be identified. For example, the design pattern may identify an approved set of control requirement.

In one embodiment, the design pattern may be defined using machine learning and may be based on prior control requirements applied for the module, attributes, and deployment platform.

In step 330, the identified patterns may be applied.

In step 335, any remaining actions to implement the control requirements (i.e., actions remaining after the design patterns are applied) may be identified, and may be provided to the developer, the build system, etc. This may be similar to step 230, above.

In step 340, the development of the application may be tracked to verify that the controls have been implemented in the application. This may be similar to step 235, above.

In one embodiment, a combination of attribute identification and design pattern matching may be used to identify the control requirements for the module. For example, a design pattern may be identified, but the design pattern may be rejected in favor of using the attribute model. In another embodiment, the same application may include modules that use the attribute model to identify control requirements, and modules that use a design pattern to identify control requirements.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, from automated scheduling, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, Phyton, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for implementing model-based software application control frameworks, comprising:
   in an information processing apparatus comprising at least one computer processor:
     identifying a plurality of executable modules in a software application that are configured to execute independently of each other;
     breaking the software application into the plurality of executable modules;
     determining a plurality of attributes for each of the plurality of executable modules;
     identifying a deployment platform for each executable module;
     building an attribute model for the software application based on the executable modules, the attributes, and the deployment platforms;
     identifying control requirements for the attribute model;
     identifying actions to implement the control requirements; and
     executing the actions to implementing the control requirements in the software application.

2. The method of claim 1, wherein the attributes comprise at least one of an OS type, a data classification, and external interface.

3. The method of claim 1, wherein the attributes are automatically identified using at least one of a code scan, an inventory system, and a server scan.

4. The method of claim 1, wherein the control requirements are based on a policy for an organization.

5. The method of claim 1, wherein the actions to implement the control requirements are specific to the deployment platform.

6. The method of claim 1, further comprising:
   tracking the implementation of the control requirements into the software application.

7. A method for implementing model-based software application control frameworks, comprising:
   in an information processing apparatus comprising at least one computer processor:
     identifying a plurality of executable modules in a software application that are configured to execute independently of each other;
     breaking the software application into the plurality of executable modules;
     determining a plurality of attributes for each of the executable modules;
     identifying a deployment platform for each executable module;
     identifying a design pattern associated with one of the executable modules, the attributes for the executable module, and the deployment platform for the executable module;
     identifying control requirements for the design pattern;
     identifying actions to implement the control requirements; and
     executing the actions to implement the control requirements in the software application.

8. The method of claim 7, wherein the attributes comprise at least one of an OS type, a data classification, and external interface.

9. The method of claim 7, wherein the attributes are automatically identified using at least one of a code scan, an inventory system, and a server scan.

10. The method of claim 7, wherein the control requirements are based on a policy for an organization.

11. The method of claim 7, wherein the actions to implement the control requirements are specific to the deployment platform.

12. The method of claim 7, further comprising:
    tracking the implementation of the control requirements into the software application.

13. A system for implementing model-based software application control frameworks, comprising:
    an environment for hosting a software application, the environment comprising a monitoring agent that monitors the software application for an action;
    a database comprising a plurality of control requirements; and
    an electronic device comprising at least one computer processor, wherein the electronic device performs the following:
      in response to an action identified by the monitoring agent, identify a plurality of executable modules in the software application that are configured to execute independently of each other;
      break the software application into the plurality of executable modules;
      determine a plurality of attributes for each of the executable modules;
      identify a deployment platform for each executable module;
      build an attribute model for the software application based on the modules, the attributes, and the deployment platform;
      identify control requirements in the database for the attribute model;
      identify actions to implement the control requirements; and
      execute the actions to implement the control requirements in the software application.

14. The system of claim 13, wherein the attributes comprise at least one of an OS type, a data classification, and external interface.

15. The system of claim 13, wherein the electronic device further applies a plurality of questions in a question chain to refine the attributes.

16. The system of claim 13, wherein the attributes are automatically identified using at least one of a code scan, an inventory system, and a server scan.

17. The system of claim 13, wherein the control requirements are based on a policy for an organization.

18. The system of claim 13, wherein the actions to implement the control requirements are specific to the deployment platform.

19. The method of claim 1, wherein the deployment platform comprises a public cloud, a private cloud, a physical server, and/or a virtual server.

20. The method of claim 1, wherein the attribute model identifies attributes and/or deployment platforms that require controls.

\* \* \* \* \*